W. H. SHUSTER, Jr. & A. L. GRAMMER.
WORK AND TIME INDICATOR.
APPLICATION FILED NOV. 18, 1916.
1,242,483.
Patented Oct. 9, 1917.
4 SHEETS—SHEET 1.
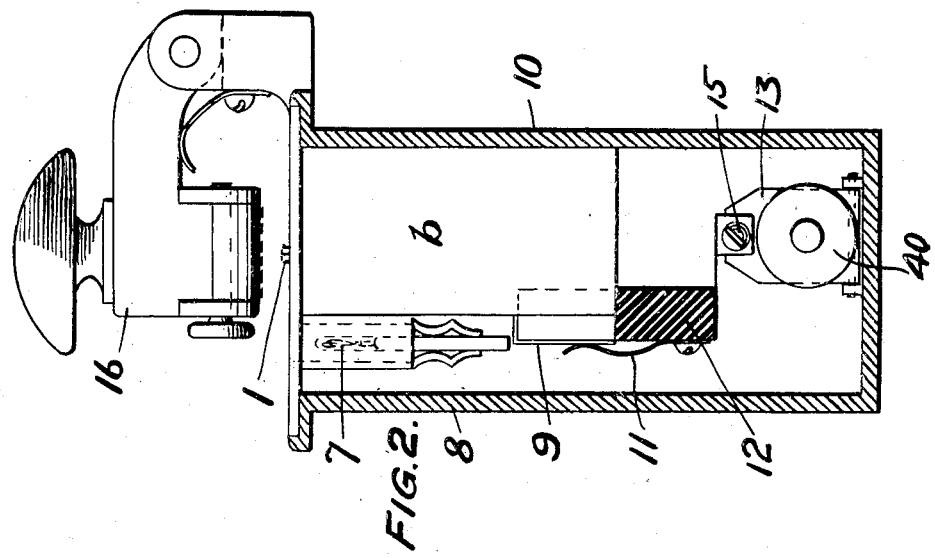
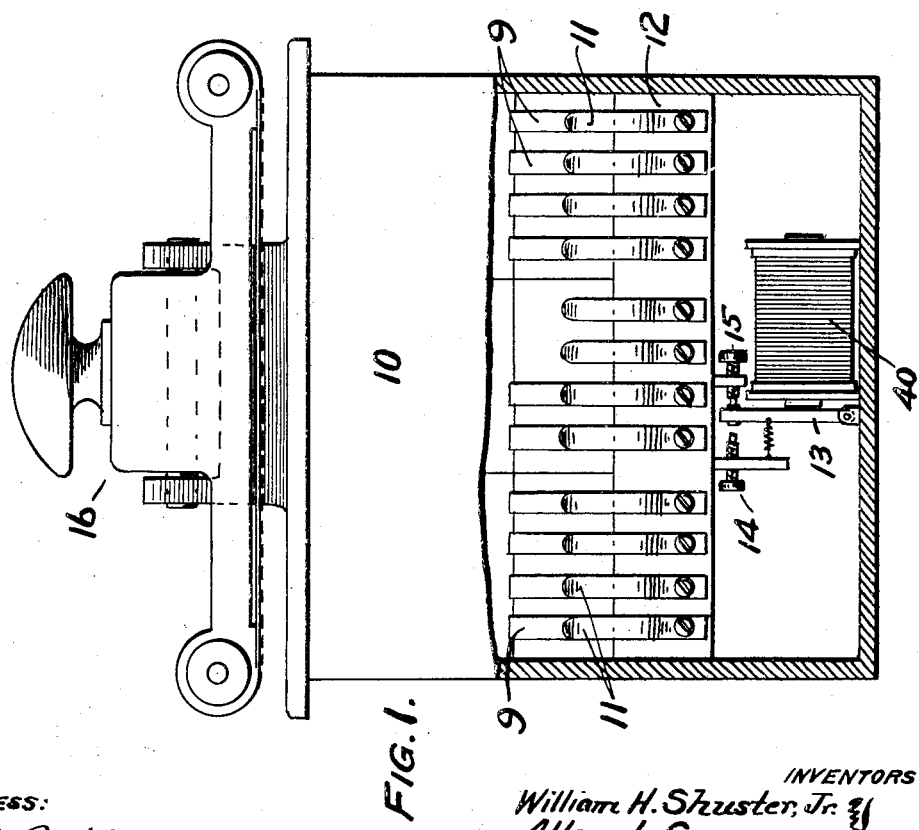
WITNESS:
INVENTORS
William H. Shuster, Jr.
Allen L. Grammer,
BY
ATTORNEY.

W. H. SHUSTER, Jr. & A. L. GRAMMER.
WORK AND TIME INDICATOR.
APPLICATION FILED NOV. 18, 1916.
1,242,483.
Patented Oct. 9, 1917.
4 SHEETS—SHEET 2.
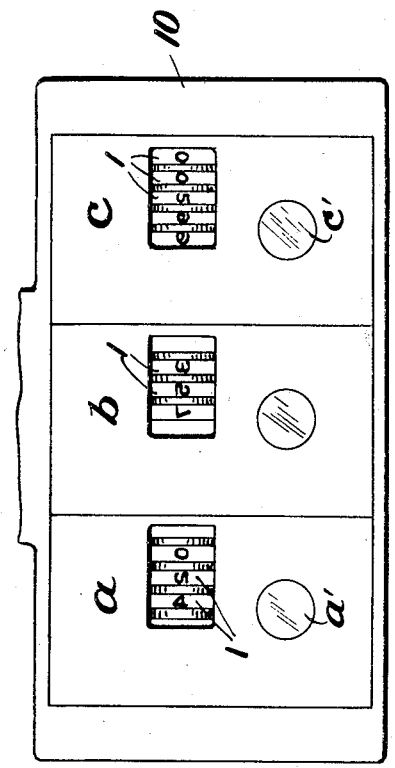
FIG. 3.
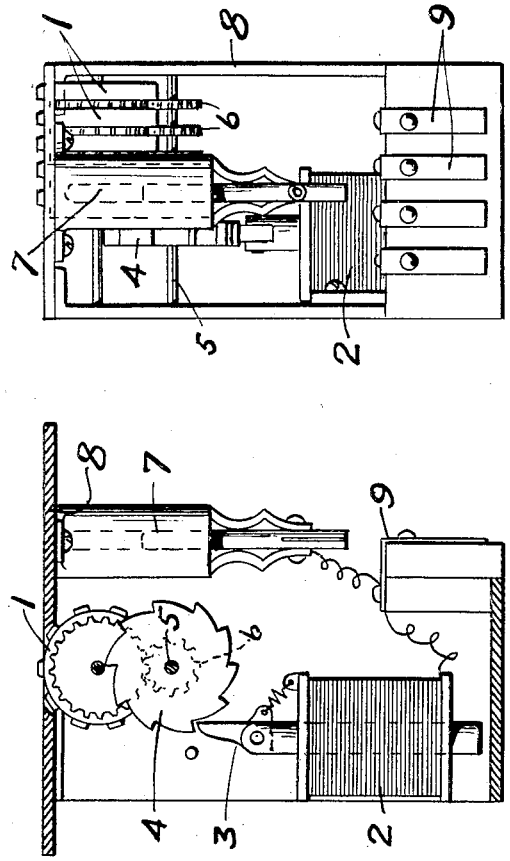
FIG. 6.
FIG. 5.
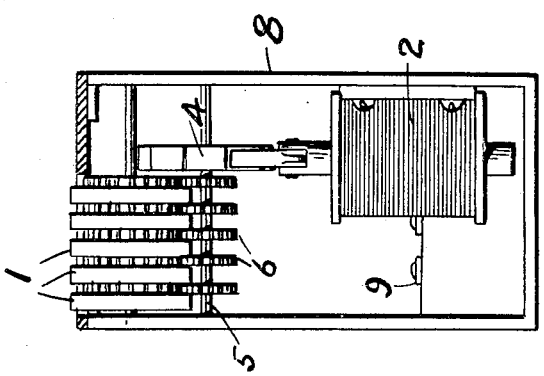
FIG. 4.
WITNESS:
Rob A Kitchel
INVENTORS
William H. Shuster, Jr.
Allen L. Grammer,
BY
Augustus B. Stoughton.
ATTORNEY.

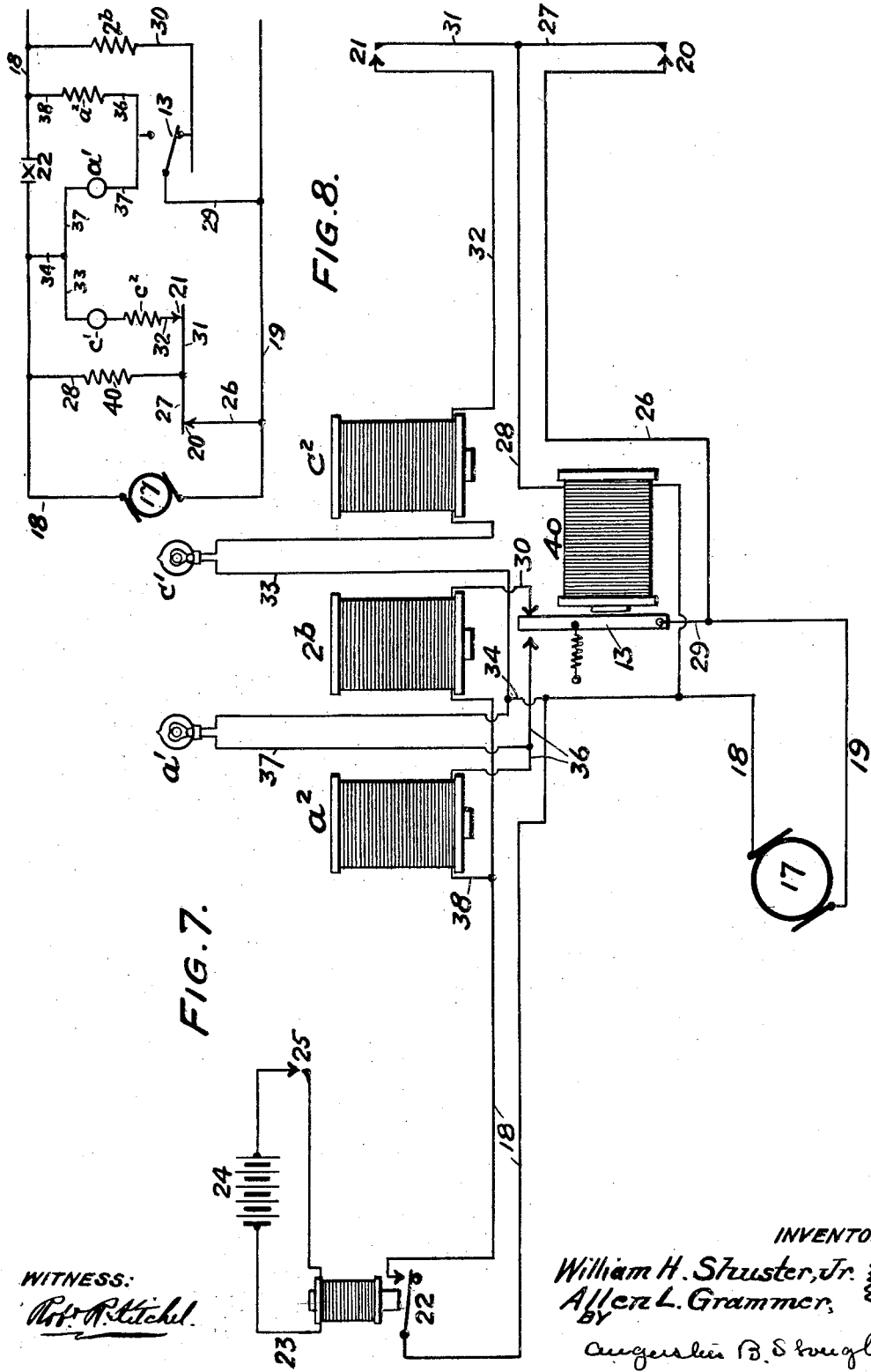

W. H. SHUSTER, Jr. & A. L. GRAMMER.
WORK AND TIME INDICATOR.
APPLICATION FILED NOV. 18, 1916.

1,242,483.

Patented Oct. 9, 1917.
4 SHEETS—SHEET 4.

WITNESS:
Rob P. Kitchel

INVENTORS
William H. Shuster, Jr.
Allen L. Grammer
BY
Augustus B. Stoughton
ATTORNEY.

UNITED STATES PATENT OFFICE.

WILLIAM H. SHUSTER, JR., AND ALLEN L. GRAMMER, OF PHILADELPHIA, PENNSYLVANIA.

WORK AND TIME INDICATOR.

1,242,483.   Specification of Letters Patent.   Patented Oct. 9, 1917.

Application filed November 18, 1916.   Serial No. 132,025.

*To all whom it may concern:*

Be it known that we, WILLIAM H. SHUSTER, Jr., and ALLEN L. GRAMMER, both citizens of the United States, and residents of Philadelphia, in the county of Philadelphia and State of Pennsylvania, have invented a certain new and useful Work and Time Indicator, of which the following is a specification.

The principal objects of the present invention, are first, to provide reliable, comparatively simple and inexpensive apparatus for showing, as at some central point, the operation of a machine and for obtaining, when desired, a printed record of that operation, so as to indicate the amount of delay time, or in other words the amount of time when the machine is not running, and also the running time or in other words the time when the machine is running, and also the amount of the production, or in other words the amount of work done by the machine; second, to operate the time indicator electrically with comparatively little wiring and with electrical and mechanical devices which are simple and to a large extent duplicates of each other, and third, to provide for showing or recording the cause to which the delay time is attributed or by which it is explained.

The invention will be claimed at the end hereof but will be first described in connection with the embodiment of it, chosen from among other embodiments, for the sake of illustration in the accompanying drawings, in which—

Figure 1, is a front view with parts broken away of what might be called the indicator proper.

Fig. 2, is a side view of the same, partly in section.

Fig. 3, is a top or plan view of the same with parts removed.

Figs. 4, 5, and 6 are respectively a rear, side and front view, with parts removed, of one of the units which make up the device shown in Fig. 1.

Fig. 7, is a wiring diagram.

Fig. 8, is a diagrammatic view of the circuits added for purposes of description.

Figure 9:
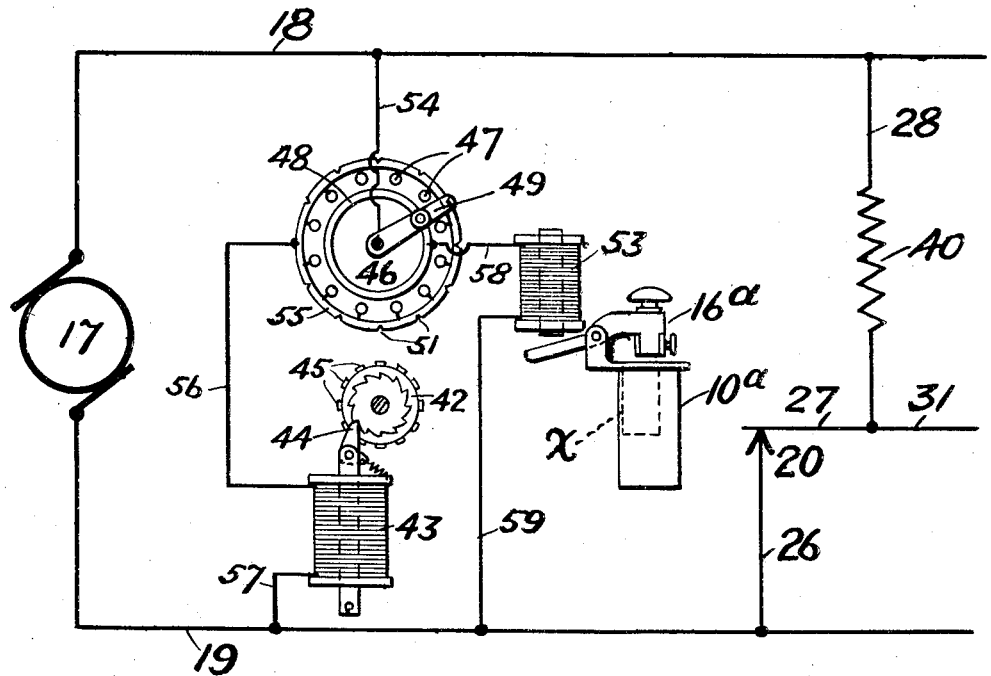

Fig. 9, is a diagrammatic view illustrating the delay time explanation mechanism.

Figure 10:
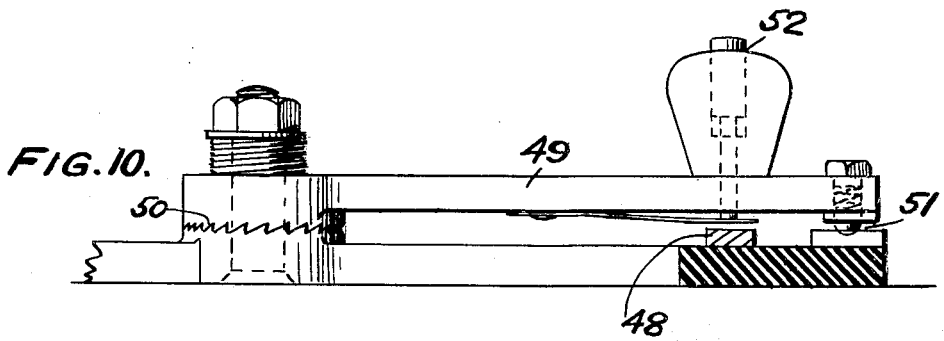
Figure 11:
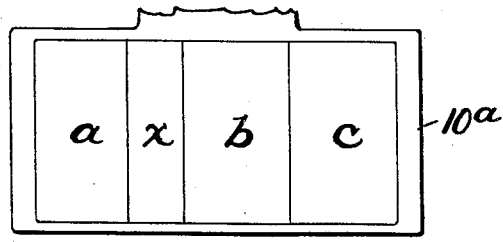

Fig. 10, is a side view, partly in section and drawn to an enlarged scale, of one of the parts illustrated in Fig. 9, and Fig. 11, is a top view illustrating diagrammatically the application of a delay time explanatory unit to the units shown in Fig. 3.

A description will be given in connection with Figs. 4, 5, and 6 of one of the units and this will suffice, since the units are substantially alike. Each unit consists of an electro-magnetically operated adder. 1, are the adding wheels and the numbers on them can be arranged for printing. 2, is the electro-magnet or solenoid and 3, is the spring-pawl and 4 the ratchet wheel by means of which these adding wheels are turned through the instrumentality of the shaft 5 and driving wheels 6, the teeth of which are appropriate for the purpose. Each stroke of the armature or core of the winding 2 causes the adding machine to add one unit. 7, is a lamp, and the lamps may be of different appropriate color. The parts making up a unit are arranged in a suitable frame 8 and the frame carries contacts 9, to which are appropriately connected the terminals of the lamp and winding 2. These units are placed in a housing 10 provided on top with suitable openings for the adding wheels and with suitable windows or openings through which are displayed the lamps. The housing 10 is provided with spring strips 11 which automatically make contact with the contacts 9 when a unit is placed in the housing and these contacts or spring-strips 11 are shown as carried by an insulating bar 12 and they are, of course, connected to the circuit as will be hereinafter described. Within the housing 10 there is shown a relay magnet 40 which operates a circuit changer 13, or it might be more accurate to say that the parts 40 and 13 with the contacts 14 and 15 constitute a circuit changer.

Referring to Fig. 3, the wheels $a$ indicate delay time, the wheels $b$ running time, and the wheels $c$, work or production. Under this assumption there may be more adding wheels at $c$ than at $a$ and $b$, and the lamp at $b$ may be omitted but these are immaterial changes which do not affect the substantial identity of the units. The lamp at $a$ is marked $a^1$, Fig. 3, and the lamp at $c$ is marked $c^1$.

When the machine in respect to which the indicator is to operate is at rest, the adding wheels $a$ add one unit which may conveniently be one unit for each tenth of an hour, so that the wheels at *a* show the lapse of time during which the machine is idle, or in other words, show delay time. The lamp $a^1$ indicates at a glance that the machine is not running and it may be a red lamp so as to emphasize that fact. When the machine is running the wheels at *b* indicate lapse of time and no light is shown, or it might be more accurate to say that this occurs when power is applied to the machine.

The production of, or work done by, the machine is shown by the wheels *c*, which add for each unit of work produced and the fact that work is, or is not, being done is shown by the light $c^1$, which may flicker and be of contrasting color to the light $a^1$.

16 is a printing stamp by means of which the total shown on the wheels may at any time or at predetermined times be printed on a card, tape or sheet, for reference.

A description will now be given, more particularly with reference to Fig. 8, of circuits that are suitable for bringing about the results above indicated in connection with the apparatus hereinbefore described.

17 indicates a source of current for supplying the leads 18 and 19. 20 indicates a contact which is closed when power is applied to the machine and is opened when power is turned off from the machine and this contact 20 may be referred to as a starting switch. 21 is a circuit interrupter that may be called a production circuit interrupter and it is actuated in response to the units of work done by the machine or to the product as it leaves the machine; so that every time a product leaves the machine this interrupter is actuated. This make and break device 21, is not operated by hand, but by products passing through the machine or automatically by the machine in doing its work. 22, is a means for connecting and disconnecting parts of a conductor at regular intervals of time, for instance at intervals of one-tenth of an hour, or six minutes. As shown, Fig. 7, this means is actuated by a relay circuit 23, including a source 24 and a circuit opener and closer 25 that works in response, for example, to a clock mechanism. It may, however, be said that in most factories there is present a time circuit and it can be availed of.

Assuming that the machine is running, the contact is closed at 20 and there is a circuit between 18 and 19 by the path 26, 27 and 28, through 40 and current flows continuously through this path because the time device 22 is arranged farther away from the generator than this path. Current in this path energizes the magnet 40 and causes a circuit changer 13 to assume the position shown in Fig. 7 and to close a path from 19 by 29, and 30 to 18, thus energizing the magnet or solenoid $2^b$, which is marked $2^b$ because it is the magnet which drives the adding wheels 1 of the unit *b*, and since the path 30 is connected beyond the time device 22, the time device 22 breaks the circuit at intervals of say six minutes through the winding $2^b$ and so causes the wheels at *b* to be operated so as to show lapse of time.

The production circuit interrupter 21 makes and breaks a path from 19 by 26, 27, 31, 32, winding marked $c^2$, because it is the magnet that works the wheels at *c*, lamp $c^1$, 33 and 34 to the lead 18 on the source or generator side of the time device 22. For each unit of work an impulse is given to the magnet $c^2$, so that the wheels 1 of unit *c* count the same.

When the machine is at rest the path for current is broken at 20 and 21 because the machine is stopped and no production is taking place or work being done, the winding 40 is therefore deënergized and the circuit changer 13 under the influence of its retracting spring closes a new path. This new path is from 19 to 29, 13 by branch 37 and 34 through lamp $a^1$, to lead 18 on the generator side of the device 22, and from 13, by another branch 36 through winding marked $a^2$, because it operates the wheels at *a*, and 38 to lead 18 outside of the device 22. The circuit through the magnet $a^2$ is therefore interrupted at intervals of, for example, one-tenth of an hour and the total of these intervals is shown by the wheels at *a*.

By reference to Fig. 7, it will be seen that only three wires need be extended to the machine in respect to which the indicator is to work, so that an economy is effected and from an inspection of that figure it is also evident that the wiring is extremely simple and inexpensive as are also all of the devices employed, while at the same time the indicator is efficient and is of obvious advantage in ascertaining the efficiency of a machine or machines. Of course it will be understood that by a mere extension of the subject-matter already described, indicators can be employed at any convenient central station or stations for any number of machines and that by the use of cards or tape or sheets, stamped from the described wheels, a record of operations can be kept.

A mechanism will now be described by means of which the operator may, if desired, transmit to and record at the described work and time indicator the cause occasioning delay time, and in this connection reference will be made to Figs. 9 to 11. X is an additional unit which may be called a delay-time explanation unit and it comprises an electro-responsive wheel 42, shown as a printing wheel, and a solenoid or electro-magnet 43 and its driving means 44 for turning the wheel 42 in one direction and intermittently as the magnet 43 is energized and deënergized. The type or printing wheel 42 is provided with words or characters 45, indicating causes of delay time, such as enforced absence of the attendant and the like. Twelve of these characters are shown but the number is not important. The electro-magnet 43, is included in circuit with a transmitter 46, provided with contacts 47, corresponding in number and meaning with the characters 45. This transmitter is also provided with a printing contact 48, shown as a ring, and with a turnable arm 49. The arm 49 can be turned in one direction only by reason of the ratchet mechanism 50 and its normal movements are intermittent by reason of the detent mechanism 51, shown to comprise a spring-pressed ball and ball-pits. In passing from ball-pit to ball-pit, the arm 49 which carries current, makes contact with the contacts 47 progressively and one at a time. The arm 49 is also provided with a hand or finger switch 52, which when operated makes contact with the contact 48. In circuit with the contact 48 is a printing magnet or solenoid 53 adapted to operate a printer 16ᵃ, mounted on the housing 10ᵃ, which corresponds with the housing 10, but contains the unit X. A circuit path may be traced as follows, from 18, by 54 to arm 49, thence by one of the contacts 47, through contact connector 55 to conductor 56, through winding 43 and by 57 to 19, from arm 49 there is another path by 52, 48, and 58 through winding 53, and 59 to 19. In use the operator turns the signal arm 49 and thus the wheel 42 is turned in synchronism with it, until the arm is in the position indicating the cause of the delay. The character on the wheel 42 corresponding to that position is therefore in printing position. The operator then closes the switch 52, so that the winding 53 is energized and causes the printer 16ᵃ to print the appropriate character. For normal positions of rest of the signal arm, no character 45 is in printing position. The circuit for operating the delay time explanation unit is of course not time controlled so that this unit can be connected on the generator or continuous source side of the device 22, and this is the arrangement of Fig. 9.

What we claim is:

1. A work and time indicator comprising the combination of a continuous source of current and a time interrupted source of curent having means for interrupting its circuit at regular time intervals, a production circuit interrupter automatically responsive to work and a starting switch in series relation, an electro-magnetic circuit changer and its circuit connections to the continuous source and responsive to the starting switch, a delay-time electric adder having driving circuit connections connected with the time interrupted source in the position of the circuit changer corresponding to open position of the starting switch, a running time electric adder having driving circuit connections connected with the time interrupted source in the position of the circuit changer corresponding with closed position of the starting switch, and an electric production adder and driving circuit connections responsive to the production circuit interrupter and connected with the continuous source through the starting switch.

2. A work and time indicator comprising the combination of a continuous source of current and a time interrupted source of current having means for interrupting its circuit at regular time intervals, a production circuit interrupter automatically responsive to work and a starting switch in series relation, an electro-magnetic circuit changer and its circuit connections to the continuous source and responsive to the starting switch, a delay-time electric adder and its signal lamp and driving circuit connections connected with the time interrupted source in one position of the circuit changer, corresponding to open position of the starting switch, a running time electric adder and driving circuit connections connected with the time interrupted source in the position of the circuit changer corresponding with closed position of the starting switch, and a production adder and its signal lamp and driving circuit connections responsive to the production circuit interrupter and connected with the continuous source only when the starting switch is closed.

3. A work and time indicator comprising the combination of a continuous source of current and a time interrupted source of current having means for interrupting its circuit at regular time intervals, a production circuit interrupter automatically responsive to work and a starting switch in series relation, an electro-magnetic circuit changer and its circuit connections to the continuous source and responsive to the starting switch, a delay-time electric adder and circuit and driving connections connected with the time interrupted source in one position of the circuit changer corresponding to open position of the starting switch, a running time adder and driving circuit connections connected with the time interrupted source in the other position of the circuit changer, a production adder and driving circuit connections responsive to the production circuit interrupter and connected with the continuous source only when the starting switch is closed, and mechanism for printing from said adders.

4. A work and time indicator comprising the combination of a set of electric adders, a time circuit provided with means for breaking it at regular time intervals, means for automatically cutting in one and cutting out the other of two of said adders in respect to the time circuit and in response to starting and stopping to register delay and running time, and a production circuit-interrupter automatically responsive to work and a starting switch in series relation and their continuous circuit connections for actuating the third adder in response to both said interrupter and switch to register production.

5. A work and time indicator comprising the combination of a set of electric adders, a time circuit provided with means for breaking it at regular intervals, means for automatically cutting in one and cutting out the other of two of said adders in respect to said time circuit and in response to starting and stopping to register delay and running time, and a production circuit-interrupter automatically responsive to work and a starting switch in series relation and their continuous circuit connections for actuating the third adder in response to both said interrupter and switch to register production, and printing mechanism for said adders.

6. A work and time indicator comprising the combination of electric adders, a continuous circuit, a time circuit, means for interrupting the time circuit at time intervals, a controller for automatically including one and excluding another of said adders in the time circuit to drive them, and circuit closers in series relation for including the third adder in the continuous circuit, substantially as described.

7. A work and time indicator comprising the combination of electric adders, a continuous circuit, a time circuit, means for interrupting the time circuit at time intervals, a controller for automatically including one and excluding another of said adders in a time circuit to drive them, circuit closers in series relation for including the third adder in the continuous circuit to drive them, and printing mechanism for said adders, substantially as described.

8. A work and time indicator comprising the combination of electric adders, a time interrupted circuit, means for interrupting the time circuit at time intervals, a continuous circuit, a controller for automatically including one and excluding another of said adders in the time circuit, a circuit closer, a circuit make and break device responsive to production for including the third adder in the continuous circuit and interrupting the latter, and a starting switch in series with the make and break devices, substantially as described.

9. In a work and time indicator the combination of a delay-time wheel, a delay explanation wheel, a signal arm and its circuit, an electro-mechanical mechanism for turning the delay explanation wheel in synchronism with the arm, electro-mechanical printing mechanism common to both wheels, and a hand switch at the signal arm and a second circuit for operating the printing mechanism, substantially as described.

W. H. SHUSTER, JR.
A. L. GRAMMER.